US010139518B2

(12) United States Patent
Evans (10) Patent No.: US 10,139,518 B2
(45) Date of Patent: Nov. 27, 2018

(54) NEUTRON GAMMA DENSITY CORRECTION USING ELEMENTAL SPECTROSCOPY

(71) Applicant: SCHLUMBERGER TECHNOLOGY CORPORATION, Sugar Land, TX (US)

(72) Inventor: Michael Lynn Evans, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 161 days.

(21) Appl. No.: 15/177,427

(22) Filed: Jun. 9, 2016

(65) Prior Publication Data

US 2017/0357027 A1   Dec. 14, 2017

(51) Int. Cl.
*G01V 5/10* (2006.01)
(52) U.S. Cl.
CPC .................................. *G01V 5/105* (2013.01)
(58) Field of Classification Search
CPC ........ G01V 5/101; G01V 5/102; G01V 5/104; G01V 5/125; G01V 5/10; G01V 5/105
USPC ... 250/269.6, 269.2, 269.7, 254, 269.1, 265, 250/256, 269.4
See application file for complete search history.

(56) References Cited

U.S. PATENT DOCUMENTS

| | | | |
|---|---|---|---|
| 4,810,876 A * | 3/1989 | Wraight | G01V 5/10 250/256 |
| 5,608,215 A | 3/1997 | Evans | |
| 5,804,820 A | 9/1998 | Evans et al. | |
| 7,073,378 B2 | 7/2006 | Smits et al. | |
| 7,334,465 B2 | 2/2008 | Smits et al. | |
| 8,868,346 B2 * | 10/2014 | Evans | G01V 5/104 702/13 |
| 8,918,287 B2 | 12/2014 | Evans | |
| 2012/0016588 A1 * | 1/2012 | Evans | G01V 5/104 702/8 |
| 2012/0197529 A1 * | 8/2012 | Stephenson | G01V 5/101 702/8 |
| 2013/0048849 A1 * | 2/2013 | Li | G01V 5/101 250/269.8 |
| 2014/0042311 A1 * | 2/2014 | Zhou | G01V 5/101 250/269.8 |

(Continued)

*Primary Examiner* — David Porta
*Assistant Examiner* — Blake Riddick (57) ABSTRACT

A method for determining a corrected neutron gamma density of a formation includes emitting neutrons into a formation using a neutron source to generate gamma-rays. Additionally, the method includes detecting a first count rate of gamma-rays and a gamma-ray spectrum using at least a gamma-ray detector of the downhole tool. The method also includes detecting a second count rate of neutrons using a neutron detector. The method includes using a processor to perform a gamma-ray spectroscopy analysis on the formation based on the gamma-ray spectrum and determining a correction based on results of the gamma-ray spectroscopy analysis. The method includes applying the correction to the first count rate or the second count rate and determining a neutron gamma density of the formation based on a first corrected count rate of gamma-rays or a second corrected count rate of neutrons. The method also includes outputting the determined density of the formation.

18 Claims, 6 Drawing Sheets

(56) References Cited

U.S. PATENT DOCUMENTS

2016/0195636 A1\* 7/2016 Grau .................. G01V 5/104
                                                250/269.2
2016/0349399 A1\* 12/2016 Zhou .................. G01V 5/101
2017/0176634 A1\* 6/2017 Evans .................. G01V 5/101

\* cited by examiner

NEUTRON GAMMA DENSITY CORRECTION USING ELEMENTAL SPECTROSCOPY

BACKGROUND

This disclosure relates generally to neutron-gamma density (NGD) well logging and, more particularly, to techniques for obtaining an accurate NGD measurement in certain formations using a correction factor based on elemental spectroscopy.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Techniques have been developed to generate gamma-rays for a formation density measurement without radioisotopic gamma-ray sources. One such technique is referred to as a neutron-gamma density (NGD) measurement. An NGD measurement involves emitting neutrons into the formation using a neutron source, such as a neutron generator. Some of these neutrons may inelastically scatter off certain elements in the formation, generating inelastic gamma-rays that are detected by a gamma-ray detector in the tool that may enable a formation density determination. Although an NGD measurement based on these gamma-rays may be accurate in some formations, the NGD measurement may be less accurate in other formations, depending on the formation composition.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one example, a method includes emitting neutrons into a formation using a neutron source of a downhole tool, such that at least a portion of the neutrons scatter off the formation to generate gamma-rays. The method also includes detecting a first count rate of gamma-rays using a gamma-ray detector of the downhole tool. Additionally, the method includes detecting a gamma-ray spectrum using the gamma-ray detector. Further, the method includes detecting a second count rate of neutrons that return to the downhole tool using a neutron detector of the downhole tool. Furthermore, the method includes using a processor to perform a gamma-ray spectroscopy analysis on the formation based on the detected gamma-ray spectrum and determining a correction based at least in part on results of the gamma-ray spectroscopy analysis. Moreover, the method includes applying the correction to the first count rate, the second count rate, or both and determining a neutron gamma density of the formation based at least in part on a first corrected count rate of gamma-rays, a second corrected count rate of neutrons, or both. The method also includes outputting the determined density of the formation.

In another example, a system includes a downhole tool. The downhole tool includes a neutron source that emits neutrons into a formation at an energy sufficient to cause at least a portion of the neutrons to inelastically scatter off elements of the formation, generating inelastic gamma-rays. The downhole tool also includes a gamma-ray detection assembly including a gamma-ray detector that detects a first count rate of inelastic gamma-rays that scatter through the formation to reach the downhole tool and a gamma-ray spectrum of the formation, and a neutron detection assembly including a neutron detector that detects a second count rate of neutrons that return to the downhole tool. Additionally, the system includes data processing circuitry that performs a gamma-ray spectroscopy analysis on the gamma-ray spectrum of the formation. The data processing circuitry also corrects the first count rate, the second count rate, or both based on results of the gamma-ray spectroscopy analysis, and determines a density of the formation based at least in part on a first corrected count rate of inelastic gamma-rays, a second corrected count rate of neutrons, or both.

In another example, a non-transitory computer readable medium comprising executable instructions which, when executed by a processor, cause the processor to instruct a neutron source of a downhole tool to emit neutrons into a formation at an energy sufficient to cause at least a portion of the neutrons to inelastically scatter off elements of the formation, generating inelastic gamma-rays. The instructions also cause the processor to instruct at least a gamma-ray detector to detect a first count rate of inelastic gamma-rays that scatter through the formation to reach the downhole tool and a gamma-ray spectrum of the formation and instruct at least a neutron detector to detect a second count rate of neutrons that return to the downhole tool. Additionally, the instructions cause the processor to perform a gamma-ray spectroscopy analysis on the formation based on the gamma-ray spectrum and determine a neutron gamma density of the formation based at least in part of the first count rate of inelastic gamma rays and the second count rate of neutrons. Further, the instructions cause the processor to determine a correction of the neutron gamma density based at least in part on results of the gamma-ray spectroscopy analysis. Furthermore, the instructions cause the processor to apply the correction to the neutron gamma density of the formation to determine a corrected neutron gamma density and output the determined density of the formation.

Technical effects of the present disclosure include the accurate determination of a neutron-gamma density (NGD) measurement for a broad range of formations, including formations with a high concentration of iron and/or aluminum. These NGD measurements may remain accurate even when the configuration of a downhole tool used to obtain the neutron count rates and gamma-ray count rates used in the NGD measurement does not have an optimal configuration. Thus, despite an inability to directly measure fast neutrons (e.g., when a fast neutron detector is not present), an accurate NGD measurement still may be obtained using the disclosed systems and techniques.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of this disclosure relate to systems and techniques for obtaining a neutron-gamma density (NGD) measurement that is accurate for various formations including formations with high concentrations of iron and/or aluminum. In general, a downhole tool for obtaining such an NGD measurement may include a neutron source, at least one neutron detector, and at least one gamma-ray detector. While the downhole tool is within a borehole of a formation, the neutron source may comprise a pulsed neutron generator emitting fast neutrons of at least 2 MeV into the formation for a brief period of time, referred to herein as a "burst gate," during which the neutrons may inelastically scatter off certain elements in the formation (e.g., oxygen) to generate gamma-rays. The gamma-ray detectors of the downhole tool may detect these inelastic gamma-rays. The NGD measurement of the formation may be a function of a count rate of these inelastic gamma-rays, corrected by a neutron transport correction function based on a neutron count rate from the neutron detector(s).

It may be appreciated that the term "neutron transport" refers to the way the elements of the formation allow the neutrons to move through the formation. For example, in one formation, it may be statistically more likely that more of the neutrons will traverse deeper into the formation before inelastically scattering and generating inelastic gamma-rays. By contrast, in another formation, it may be statistically more likely that fewer of the neutrons will traverse deeper into the formation before inelastically scattering and generating inelastic gamma-rays. Since neutron transport affects the distribution of the generation of inelastic gamma-rays, the NGD measurement is, to a certain degree, a function of the neutron transport of the formation. Such a neutron transport correction function generally may accurately account for the neutron transport of most formations commonly encountered in an oil and/or gas well, resulting in an accurate NGD measurement. As used herein, an "accurate" NGD measurement may refer to an NGD measurement that is within about 0.03 g/cc the true density of a formation.

It is believed that neutron counts from some downhole tool configurations may not accurately account for fast neutron transport in certain formations. For instance, when the downhole tool does not include a fast neutron detector, thermal or epithermal neutron detectors may be used to estimate the fast neutron distribution, but count rates from thermal or epithermal neutron detectors may not always accurately reflect the fast neutron transport of some formations in the same way a fast neutron detector would. Moreover, the placement of such both thermal, epithermal, and/or fast neutron detectors in the downhole tool may involve a variety of considerations for NGD, as well as many other well logging measurements. As such, some of these thermal or epithermal detectors may not be at a location within the downhole tool that is best suited to detect count rates of neutrons so as to accurately reflect the neutron transport of some formations, when applied in a neutron transport correction function. These situations may arise when an NGD measurement is obtained in certain formations including shale formations with heavy elements. As used herein, the term "formation with heavy elements" refers to a formation with a concentration of elements of atomic mass greater than the atomic mass of hydrogen beyond a concentration limit. Shales containing high concentrations of iron or aluminum may typically be environments that require a correction.

According to embodiments of the present disclosure, when an NGD measurement is obtained in a formation, having characteristics that detectably affect the fast neutron transport in a way that differs from other formations, the gamma-ray count rate(s) used for the NGD measurement and/or a neutron transport correction function may be modified to more accurately account for the fast neutron transport of the formation. These or any other suitable corrections may be applied when the formation has one or more characteristics that are expected to cause the count rate of thermal and/or epithermal neutrons not to accurately determine a fast neutron transport of the formation, when the count rate of neutrons and/or gamma-rays is applied in a neutron transport correction function.

Figure 1:
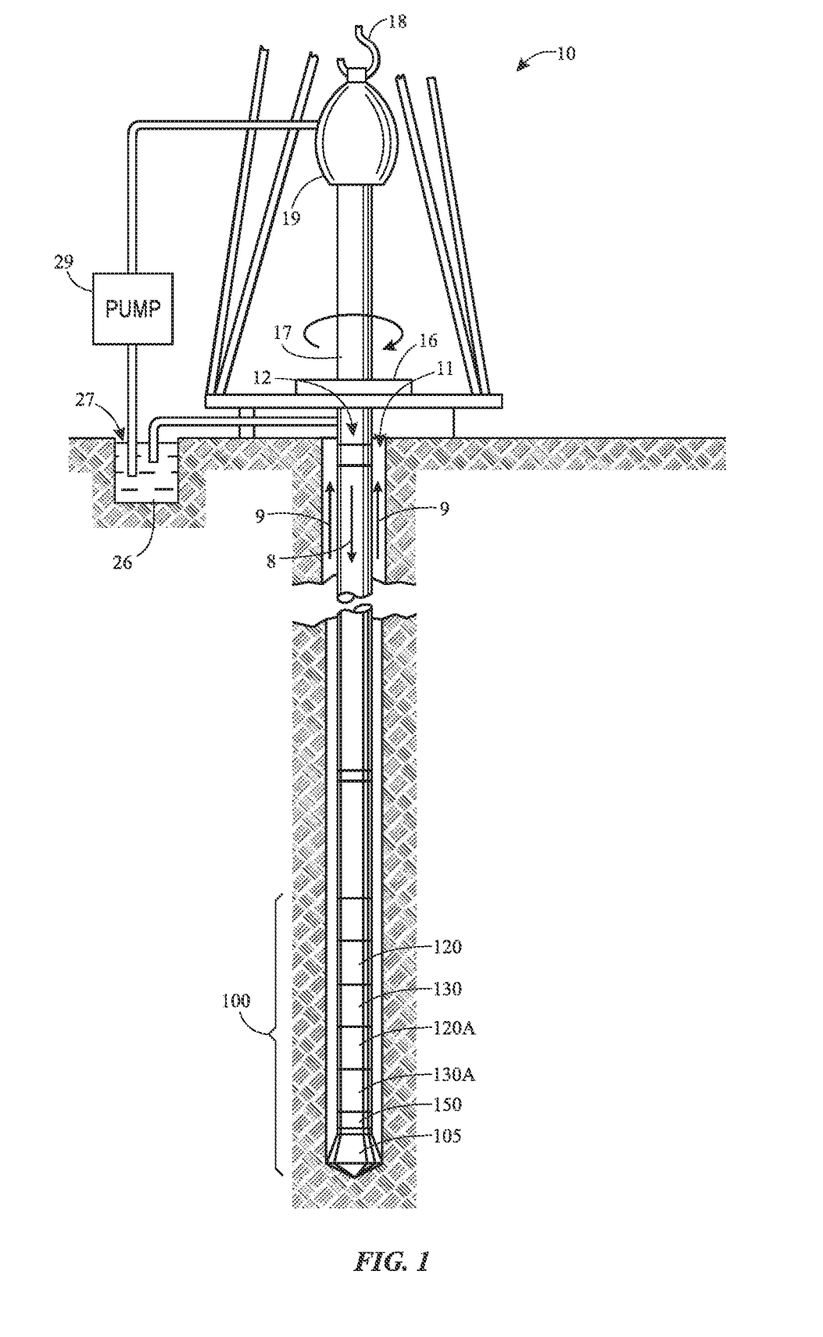
FIG. 1 is a schematic diagram of a wellsite system employing a neutron-gamma density (NGD) system, in accordance with an embodiment.

With the foregoing in mind, FIG. 1 illustrates a wellsite system in which the disclosed NGD system can be employed. The wellsite system of FIG. 1 may be onshore or offshore. In the wellsite system of FIG. 1, a borehole 11 may be formed in subsurface formations by rotary drilling using any suitable technique. A drill string 12 may be suspended within the borehole 11 and may have a bottom hole assembly 100 that includes a drill bit 105 at its lower end. A surface system of the wellsite system of FIG. 1 may include a platform and derrick assembly 10 positioned over the borehole 11, the platform and derrick assembly 10 including a rotary table 16, kelly 17, hook 18 and rotary swivel 19. The drill string 12 may be rotated by the rotary table 16, energized by any suitable means, which engages the kelly 17 at the upper end of the drill string 12. The drill string 12 may be suspended from the hook 18, attached to a traveling block (not shown), through the kelly 17 and the rotary swivel 19, which permits rotation of the drill string 12 relative to the hook 18. A top drive system could also be used, which may be a top drive system well known to those of ordinary skill in the art.

In the wellsite system of FIG. 1, the surface system may also include drilling fluid or mud 26 stored in a pit 27 formed at the well site. A pump 29 may deliver the drilling fluid 26 to the interior of the drill string 12 via a port in the swivel 19, causing the drilling fluid to flow downwardly through the drill string 12 as indicated by the directional arrow 8. The drilling fluid 26 may exit the drill string 12 via ports in the drill bit 105, and circulate upwardly through the annulus region between the outside of the drill string 12 and the wall of the borehole 11, as indicated by the directional arrows 9. In this way, the drilling fluid 26 lubricates the drill bit 105 and carries formation cuttings up to the surface, as the fluid 26 is returned to the pit 27 for recirculation.

The bottom hole assembly 100 of the wellsite system of FIG. 1 may include a logging-while-drilling (LWD) module 120 and/or a measuring-while-drilling (MWD) module 130, a roto-steerable system and motor 150, and the drill bit 105. The LWD module 120 can be housed in a special type of drill collar, as is known in the art, and can contain one or more types of logging tools. It will also be understood that more than one LWD module can be employed, as generally represented at numeral 120A. As such, references to the LWD module 120 can also mean a module at the position of 120A as well. The LWD module 120 may include capabilities for measuring, processing, and storing information, as well as for communicating with surface equipment. The LWD module 120 may be employed to obtain a neutron-gamma density (NGD) measurement, as will be discussed further below.

The MWD module 130 can also be housed in a special type of drill collar, as is known in the art, and can contain one or more devices for measuring characteristics of the drill string and drill bit. It will also be understood that more than one MWD can be employed, as generally represented at numeral 130A. As such, references to the MWD module 130 can also mean a module at the position of 130A as well. The MWD module 130 may also include an apparatus for generating electrical power to the downhole system. Such an electrical generator may include, for example, a mud turbine generator powered by the flow of the drilling fluid, but other power and/or battery systems may be employed additionally or alternatively. In the wellsite system of FIG. 1, the MWD module 130 may include one or more of the following types of measuring devices: a weight-on-bit measuring device, a torque measuring device, a vibration measuring device, a shock measuring device, a stick slip measuring device, a direction measuring device, and/or an inclination measuring device.

Figure 2:
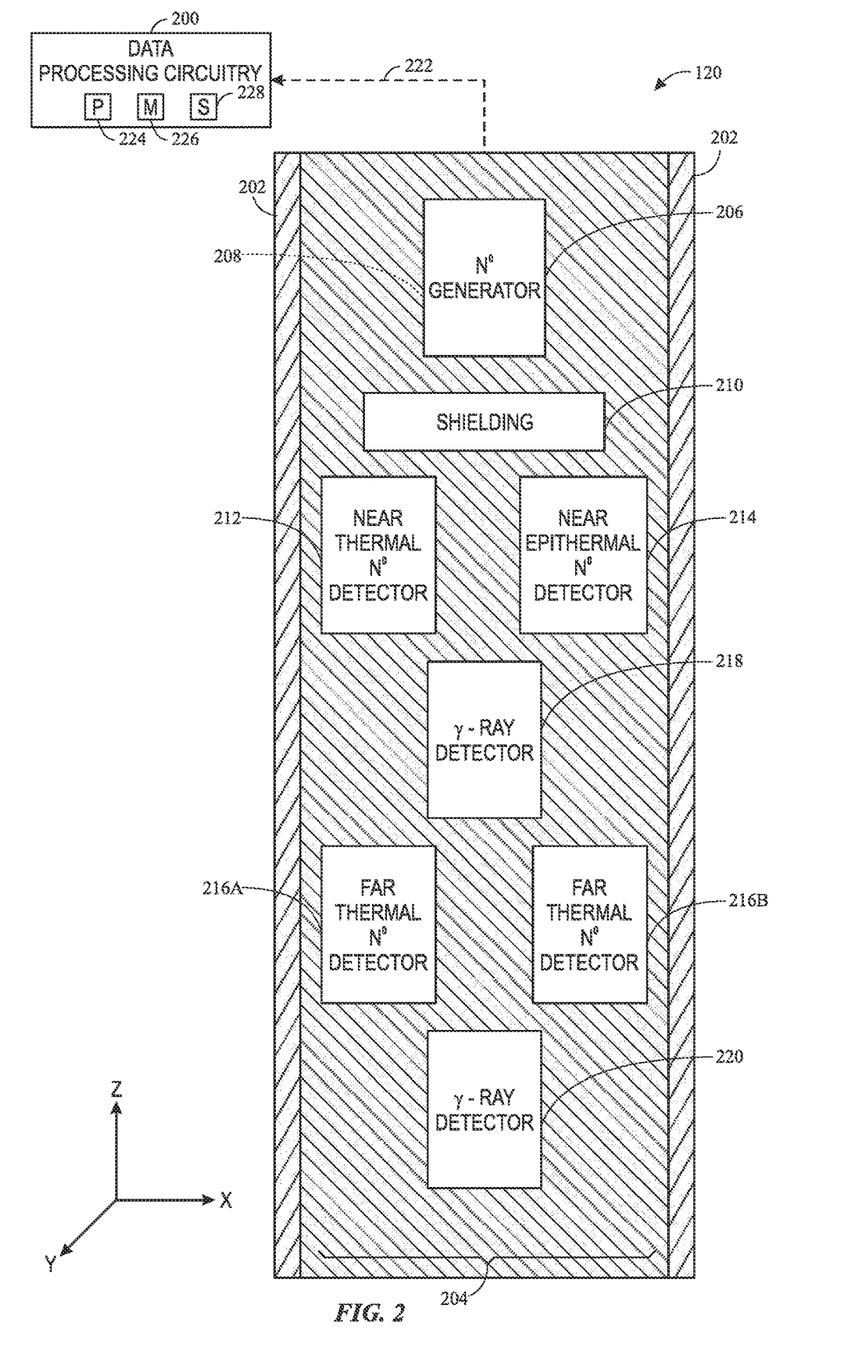
FIG. 2 is a schematic block diagram representing an NGD system capable of accurately measuring density in a formation, in accordance with an embodiment.

The LWD module 120 may be used in a neutron-gamma density (NGD) system, as shown in FIG. 2, which can accurately measure a density in various types of formations including formations with heavy elements. It may be understood that the LWD module 120 is intended to represent one example of a general configuration of an NGD tool, and that other suitable NGD tools may include more or fewer components and may be configured for other means of conveyance. Indeed, embodiments of NGD tools employing the general configuration of the LWD module 120 are envisaged for use with any suitable means of conveyance, such as wireline, coiled tubing, slickline, and so forth. By way of example, the LWD module 120 may represent a model of the EcoScope™ tool by Schlumberger.

The LWD module 120 may be contained within a drill collar 202 that encircles a chassis 204 and a mud channel 205. The chassis 204 may include a variety of components used for emitting and detecting radiation to obtain an NGD measurement. For example, a neutron generator 206 may serve as a neutron source that emits neutrons of at least 2 MeV, which is believed to be approximately the minimum energy to create gamma-rays through inelastic scattering with formation elements. By way of example, the neutron generator 206 may be an electronic neutron source, such as a Minitron™ by Schlumberger Technology Corporation, which may produce pulses of neutrons through deuteron-deuteron (d-D) and/or deuteron-triton (d-T) reactions. Thus, the neutron generator 206 may emit neutrons around 2 MeV or 14 MeV, for example. A neutron monitor 208 may monitor the neutron emissions from the neutron generator 206. By way of example, the neutron monitor 208 may be a plastic scintillator and photomultiplier that primarily detects unscattered neutrons directly emitted from the neutron generator 206, and thus may provide a count rate signal proportional to the neutron output rate from the rate of neutron output of the neutron generator 206. Neutron shielding 210, which may include lead or tungsten, for example, may largely prevent neutrons from the neutron generator 206 from passing internally through the LWD module 120 toward various radiation-detecting components on the other side of the shielding 210.

As illustrated in FIG. 2, the LWD module 120 may include two near neutron detectors, namely, a near thermal neutron detector 212 and a near epithermal neutron detector 214. Two far thermal neutron detectors 216A and 216B may be located at a spacing farther from the neutron generator 206 than the neutron detectors 212 and 214. For example, the near neutron detectors 212 and 214 may be spaced approximately 10-14 in. from the neutron generator 206, and the far neutron detectors 216A and 216B may be spaced 18-28 in. from the neutron generator 206. A short spacing (SS) gamma-ray detector 218 may be located between the near neutron detectors 212 and 214 and the far neutron detectors 216A and 216B. A long spacing (LS) gamma-ray detector 220 may be located beyond the far neutron detectors 216A and 216B, at a spacing farther from the neutron generator 206 than the gamma-ray detector 218. For example, the SS gamma-ray detectors 218 may be spaced approximately 16-22 in. from the neutron generator 206, and the LS gamma-ray detector 220 may be spaced approximately 30-38 in. from the neutron generator 206. Embodiments of the LWD module 120 may include more or fewer of such radiation detectors, but generally may include at least one gamma-ray detector and at least one neutron detector. For instance, the neutron detector may be a long spacing (LS) detector. The tool may also comprise one or more SS or LS neutron detectors, such as an additional thermal neutron detector. Configurations in which the tool comprises fewer detectors than in the embodiment of FIG. 2 are also included in the scope of the present disclosure.

The neutron detectors 212, 214, 216A, and/or 216B may be any suitable neutron detectors, such as $^3$He neutron detectors. To detect primarily epithermal neutrons, the epithermal neutron detector 214 may be surrounded by thermal neutron shielding, while the thermal neutron detectors 212, 216A, and/or 216B may not. In general, the detection of substantially only epithermal neutrons may allow the epithermal neutron detector 214 to measure the extent of a fast neutron distribution through most formations, and thus such a neutron count rate may be used to account for fast neutron transport through the formations in an NGD measurement.

Moreover, in formations with heavy elements, such as shales with high concentrations of iron or aluminum, the neutron detectors 212, 214, 216A, and/or 216B generally may not provide a neutron count rate that accurately reflects the fast neutron transport of such formations. Although it is believed that this deficiency could be addressed by using a fast neutron detector in the LWD module 120, it may be difficult to implement such a fast neutron detector in a downhole tool. For example, it may be difficult to find a suitable sensor capable of working downhole that has high sensitivity and that is compact enough to fit within the LWD module 120. As will be discussed below, for such formations with heavy elements, an NGD measurement obtained using the LWD module 120 may be corrected to approximate that which would be expected if the neutron detectors 212, 214, 216A, and/or 216B were fast neutron detectors.

The gamma-ray detectors 218 and/or 220 may be scintillator detectors surrounded by neutron shielding. The neutron shielding may include, for example, $^6$Li, such as lithium carbonate ($Li_2CO_3$), which may substantially shield the gamma-ray detectors 218 and/or 220 from thermal neutrons without producing thermal neutron capture gamma-rays. The gamma-ray detectors 218 and 220 may detect inelastic gamma-rays generated when fast neutrons from the neutron generator 206 inelastically scatter off certain elements of a surrounding formation. As will be discussed below, a neutron-gamma density (NGD) measurement may be a function of the inelastic gamma-ray counts obtained from the gamma-ray detectors 218 and 220, corrected for the fast neutron transport of the formation by the indirect measurement of neutron flux obtained from the neutron detectors 212, 214, 216A, and/or 216B. Using the systems and techniques disclosed herein, such an NGD measurement may provide enhanced accuracy to the system regardless of whether the formation is a formation with a high concentration of heavy elements or a formation that has one or more characteristics that may cause the count rate of neutrons not to accurately correspond to a fast neutron transport of the formation.

The count rates of gamma-rays from the gamma-ray detectors 218 and 220 and count rates of neutrons from the neutron detectors 212, 214, 216A, and/or 216B may be received by data processing circuitry 200 as data 222. The data processing circuitry 200 may receive the data 222 and process the data 222 to determine one or more properties of the surrounding formation, such as formation density. The data processing circuitry 200 may include a processor 224, memory 226, and/or storage 228. The processor 224 may be operably coupled to the memory 226 and/or the storage 228 to carry out the presently disclosed techniques. These techniques may be carried out by the processor 224 and/or other data processing circuitry based on certain instructions executable by the processor 224. Such instructions may be stored using any suitable article of manufacture, which may include one or more tangible, computer-readable media to at least collectively store these instructions. The article of manufacture may include, for example, the memory 226 and/or the nonvolatile storage 228. The memory 226 and the nonvolatile storage 228 may include any suitable articles of manufacture for storing data and executable instructions, such as random-access memory, read-only memory, rewriteable flash memory, hard drives, and optical disks.

The LWD module 120 may transmit the data 222 to the data processing circuitry 200 via, for example, internal connections within the tool, a telemetry system communication uplink, and/or a communication cable. The data processing circuitry 200 may be situated in the tool and/or at the surface. Accordingly, operations performed by the data processing circuitry 200 may be performed down-hole when the data processing circuitry 200 is situated in the tool or up-hole when the data processing circuitry 200 is situated at the surface. The data processing circuitry 200 may determine one or more properties of the surrounding formation. By way of example, such properties may include a neutron-gamma density (NGD) measurement of the formation. Thereafter, the data processing circuitry 200 may output a report indicating the NGD measurement of the formation. The report may be stored in memory or may be provided to an operator via one or more output devices, such as an electronic display.

Figure 3:
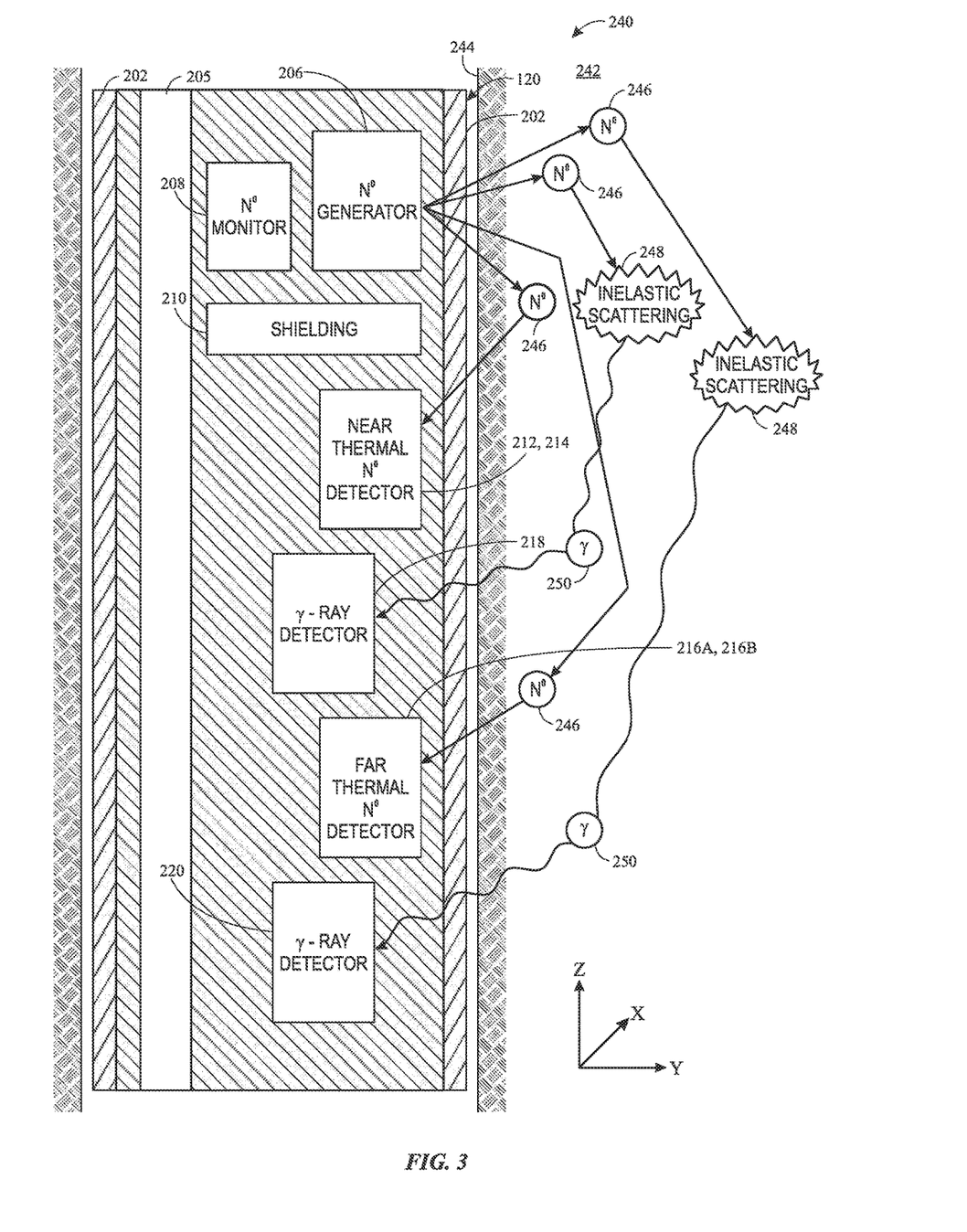
FIG. 3 is a schematic diagram representing well-logging operation using the NGD system of FIG. 2, in accordance with an embodiment.

As shown in a neutron-gamma density (NGD) well-logging operation 240 of FIG. 3, the LWD module 120 may be used to obtain a neutron-gamma density (NGD) measurement that remains accurate in a variety of formations 242. As seen in FIG. 3, the NGD well-logging operation 240 may involve lowering the LWD module 120 into the formation 242 through a borehole 244. In the example of FIG. 3, the LWD module 120 can be lowered into the borehole 244 while drilling, and thus no casing may be present in the borehole 244. However, in other embodiments, a casing may be present. Although such casing could attenuate a gamma-gamma density tool that utilized a gamma-ray source instead of a neutron generator 206, the presence of casing on the borehole 244 will not prevent the determination of an NGD measurement because neutrons 246 emitted by the neutron generator 206 may pass through casing without significant attenuation.

The neutron generator 206 may emit a burst of neutrons 246 for a relatively short period of time (e.g., 10 μs or 20 μs, or such) sufficient to substantially only allow for inelastic scattering to take place, referred to herein as a "burst gate." The burst of neutrons 246 during the burst gate may be distributed through the formation 242, the extent of which may vary depending upon the fast neutron transport of the formation 242. For some formations 242, counts of neutrons 246 obtained by the neutron detectors 212, 214, 216A, and/or 216B generally may accurately reflect the neutron transport of such formations 242. However, for other formations 242, such as formations with heavy elements, an additional correction based on an indirect measure of neutron flux may be used to more accurately account for the fast neutron transport of the formations 242. This correction may be based on count rates of other detectors, ratios of the count rates of the other detectors, measured hydrogen index or ratios of the count rate of a principal neutron detectors 212, 214, 216A, and/or 216B with a count rate of another neutron detector 212, 214, 216A, and/or 216B, etc.

Further, even if the LWD module 120 does not include a fast neutron detector, a fast neutron signal may be accounted for by existing responses from the gamma-ray detectors 218 and 220 and the neutron detectors 212, 214, 216A, and/or 216B. In particular, elemental spectroscopy information may be obtained from the short spacing gamma-ray detector 218. For example, the short spacing gamma-ray detector 218 may perform a capture gamma-ray spectroscopy operation and/or an inelastic gamma-ray spectroscopy operation by detecting a spectra of inelastic gamma-rays, and the data processing circuitry 200 may use the spectra to yield an estimate of iron, aluminum, potassium, chlorine, titanium, or other heavy elements within the formation 242. Based on the elemental spectroscopy information obtained from the gamma-ray detectors 218 and/or 220, in addition to the count rates of the neutron detectors 212, 214, 216A, and/or 216B, the fast neutron transport may be corrected for in determining the NGD of the formation 242.

Many of the fast neutrons 246 emitted by the neutron generator 206 may inelastically scatter 248 against some of the elements of the formation 242. This inelastic scattering 248 may produce inelastic gamma rays 250, which may be detected by the gamma-ray detectors 218 and/or 220. By determining a formation density by taking a ratio of inelastic gamma rays 250 detected using the two gamma-ray detectors 218 and 220 at different spacings from the neutron generator 206, lithology effects may be mostly eliminated.

From count rates of the inelastic gamma rays 250, one or more count rates of neutrons 246, and a determination of the neutron output of the neutron generator 206 via the neutron monitor 208, the data processing circuitry 200 may determine an initial estimate of electron density $\rho_{electron}$ of the formation 242. In general, the electron density $\rho_{electron}$ may be calculated according to a relationship that involves a function of a net inelastic count rate $CR_\gamma^{inel}$, corrected by a neutron transport correction based on an indirect measure of neutron flux and a downhole tool calibration correction, which may be functions of one or more neutron count rate(s) $CR_{neutron}$ and the neutron output $N_S$ of the neutron generator 206, respectively. For example, the electron density $\rho_{electron}$ calculation may take the following form:

$$\frac{\log(CR_\gamma^{inel}) - f(CR_{neutron}) - \log(C_{cal} \cdot N_S)}{c_1} = \rho_{electron}, \quad (1)$$

where $CR_\gamma^{inel}$ is the net inelastic gamma-ray count rate (i.e. the gamma-ray count rate after subtraction of gamma-rays arising from thermal and epithermal neutron capture), $CR_{neutron}$ represents a count rate of neutrons 246 from the neutron detectors 212, 214, 216A, and/or 216B, $f(CR_{neutron})$ represents a neutron transport correction, which may be a simple function of the count rate of neutrons 246 that can correct for the fast neutron transport of the formation 242 based on a directly measured neutron flux, $C_{cal}$ is a calibration constant determined experimentally using measurements in test formations of known composition, porosity and density, and $N_S$ is the neutron output of the neutron generator 206. The coefficient $c_1$ may be determined through characterization measurements and nuclear modeling.

For some formations 242, Equation (1) may result in an accurate density measurement. However, for other formations including formations 242 with relatively high concentrations of heavy elements (e.g., formations 242 having concentrations of heavy elements that may cause an NGD measurement to be inaccurate without additional correction), the neutron count rate from one or more of the neutron detectors 212, 214, 216A, and 216B may not adequately account for the fast neutron transport of such formations 242. Thus, when an NGD measurement is being determined for such formations 242, the neutron count rate $CR_{neutron}$, the count rate of inelastic gamma-rays $CR_\gamma^{inel}$, and/or the neutron transport correction function $f(CR_{neutron})$ may be corrected, as described by a flowchart 260 of FIG. 4.

Figure 4:
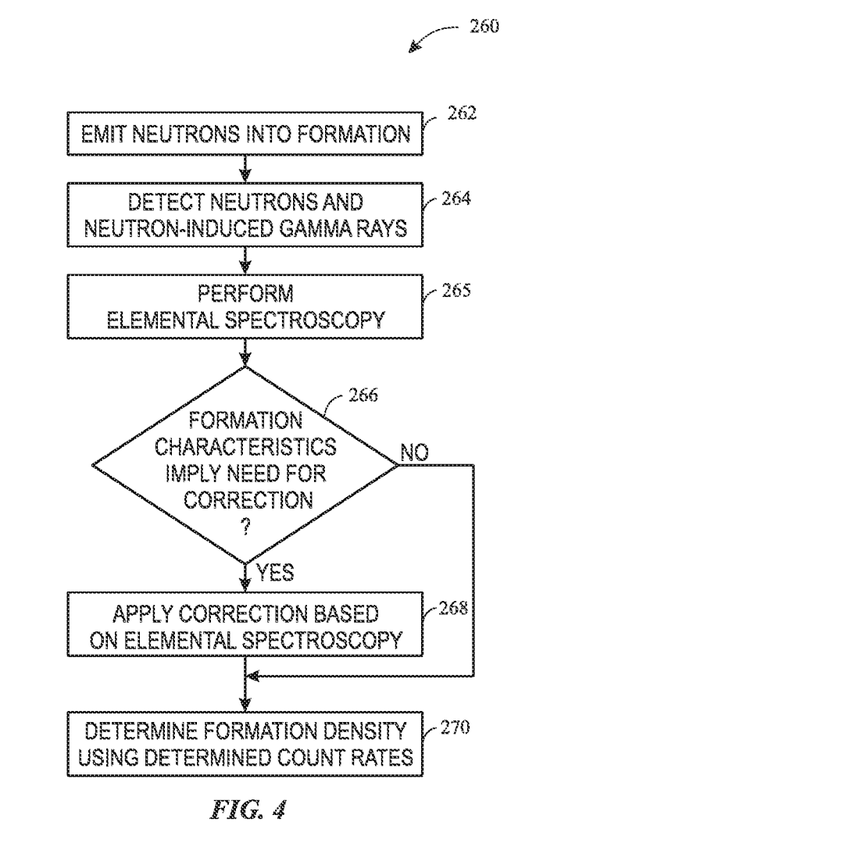
FIG. 4 is a flowchart describing an embodiment of a method for carrying out the well-logging operation of FIG. 3, in accordance with an embodiment.

The flowchart 260 of FIG. 4 represents one embodiment of a method for carrying out the well-logging operation 240 of FIG. 3. While the LWD module 120 is in the borehole 244, the neutron generator 206 may emit a burst of neutrons 246 into the formation 242 (block 262). The neutrons 246 may inelastically scatter 248 off certain elements of the formation 242, generating inelastic gamma rays 250. Count rate(s) of neutrons 246 as well as count rate(s) of inelastic gamma rays 250 may be obtained (block 264). As discussed above with reference to Equation (1), such count rate(s) of neutrons 246 generally may relate well to the fast neutron transport of the formation 242 for some formations 242 encountered in an oil and/or gas well.

In other formations 242, however, it is believed that the count rate(s) of neutrons 246 and/or the count rate(s) of gamma rays 250 may not adequately account for the neutron transport of such formations 242. Thus, at block 265, an elemental spectroscopy analysis is performed (e.g., a gamma-ray spectroscopy analysis) on the formation 242. In particular, using information obtained from the elemental spectroscopy operation by the gamma-ray detector 218 (i.e., gamma-ray spectra detected by the gamma-ray detector 218), an estimate of a concentration of iron, aluminum, potassium, chlorine, titanium, or other heavy elements within the formation 242 may be determined.

If, after receiving the information from the elemental spectroscopy analysis, the data processing circuitry 200 determines that the concentration of certain heavy elements exceeds a concentration threshold (decision block 266), which indicates that the formation 242 has characteristics that imply need for correction, the data processing circuitry 200 may undertake a suitable correction of the count rate(s) of inelastic gamma rays 250, and/or the neutron transport correction function $f(CR_{neutron})$, or may provide a global correction that applies to some or all of these terms. That is, it may be understood that modifying any of the terms in the numerator of Equation (1) could change the resulting NGD determination.

To assist in accounting for the effects of heavy elements in the formation 242 on the measured count rates, in block 268, the data processing circuitry 200 may undertake any suitable correction of any of the terms of Equation (1), based on results of the elemental spectroscopy analysis, that may cause the NGD measurement to be generally accurate for the formation 242. Using the spectroscopy element concentration estimates, the count rate correction, in block 268, may take the form:

$$CR_{net-inelastic}^{LSn,Corrected} = CR_{net-inelastic}^{LSn,UnCorrected} - \alpha Y_{Al} - \beta Y_{Fe} - \gamma Y_K - \ldots - \zeta Y_Z \quad (2),$$

where Z represents the remaining heavy elements that may have an effect on the NGD measurement, $CR_{net-inelastic}^{LSn,Corrected}$ is a corrected net inelastic count rate from the gamma-ray detector 220, $CR_{net-inelastic}^{LSn,UnCorrected}$ is an uncorrected net inelastic count rate from the gamma-ray detector 220, Y is the elemental concentration of the indicated heavy element within the formation 242 determined by the elemental spectroscopy process, and α, β, γ, and ζ are sensitivity parameters that are constants relating to a number of detected gamma-rays per unit of elemental concentration. The constants α, β, γ, and ζ may be determined in a laboratory or using a simulation by measuring a number of gamma-rays detected by the gamma-ray detector 220 from a given element versus a known concentration of that element in the formation 242. The concentrations Y are determined by analyzing the gamma-ray spectrum coming from the formation as a linear combination at each wavelength of standard spectra (determined in laboratory or by simulation) corresponding to each of the elements present in the formation. Applying the corrections for the heavy elements in the formation 242 may result in an NGD response that is corrected for the fast-neutron effects seen in the formations 242 containing high concentrations of heavy elements.

Moreover, at block 268, the spectroscopy elemental concentrations Y of Equation (2) may be used to correct count rates of the neutron detectors 212, 214, 216A, and/or 216B in computing NGD spines (i.e., a neutron transport correction). Using the spectroscopy elemental concentration estimates Y, the neutron transport correction, in block 268, may take the form:

$$CR_{Neutron}^{Corrected} = CR_{Neutron}^{Uncorrected} - \alpha Y_{Al} - \beta Y_{Fe} - \gamma Y_K - \ldots - \zeta Y_Z \quad (3),$$

where $CR_{Neutron}^{Corrected}$ represents the corrected neutron count rates from the near neutron detectors 212 and/or 214 or the far neutron detectors 216A and/or 216B, $CR_{Neutron}^{Uncorrected}$ represents the uncorrected neutron count rates from the near neutron detectors 212 and/or 214 or the far neutron detectors 216A and/or 216B, and α, β, γ, and ζ are sensitivity parameters that are constants relating the number of detected neutrons per unit of elemental concentration. More generally, Equation (3) may be the following:

$$CR_{Neutron}^{Corrected} = CR_{Neutron}^{Uncorrected} - \sum_i \alpha_i Y_i$$

Similar to Equation (2), the constants α, β, γ, and ζ may be determined in a laboratory or using a simulation by measuring a number of neutrons detected by the near neutron detectors 212 and/or 214 or the far neutron detectors 216A and/or 216B from a given element versus a known concentration of that element in the formation 242. Applying the corrections for the heavy elements in the formation 242 may result in an NGD response that is corrected for the fast-neutron effects seen in the formations 242 containing high concentrations of heavy elements. In Equation (1) the uncorrected first count of gamma-rays and/or the uncorrected second count of neutrons may be replaced respectively by the corrected first count of gamma-rays and/or the corrected second count of neutrons.

If the data processing circuitry 200 does not determine that the formation 242 has such characteristics (e.g., concentrations of heavy elements above a predetermined threshold), at decision block 266, the data processing circuitry 200 may not apply such a correction. In some embodiments, the processing circuitry 200 may not calculate or apply the count rate corrections when a concentration of heavy elements is below a threshold amount. For example, there may be inherent noise that is greater than the count rate correction when the concentrations of some of the heavy elements are below the threshold. In such a situation, the count rate correction for the particular heavy elements may not provide much or any benefit in determining the NGD of the formation 242.

In any case, the data processing circuitry 200 may subsequently determine an NGD measurement of the formation 242 using the determined count rate(s) of neutrons 246, as well as the (corrected or uncorrected) count rate(s) of inelastic gamma rays 250 (block 270), and/or the (corrected or uncorrected) neutron transport correction function $f(CR_{neutron})$, and output the corrected density (block 272). By way of example, the data processing circuitry 200 may determine the NGD measurement based on the relationship represented by Equation (1).

It may be appreciated that while the NGD measurement in FIG. 4 is determined at block 270 after the correction is applied to the count rate(s), an uncorrected NGD measurement may be calculated prior to application of the correction. When the uncorrected NGD measurement is calculated prior to application of the correction, the effect of the correction on the NGD measurement may be subtracted from the uncorrected NGD measurement to determine the corrected NGD measurement. That is, instead of applying corrections on a front-end of the NGD calculation process, the correction effects on the NGD measurement may be applied on the back-end, after the uncorrected NGD measurement is calculated.

Figure 5:
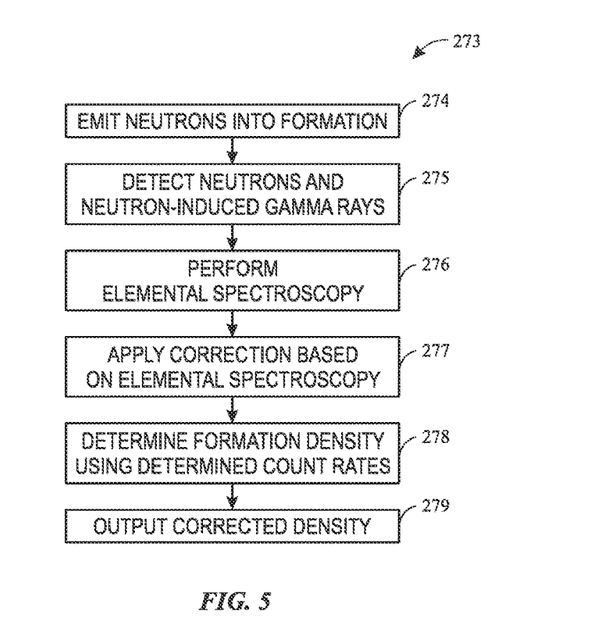
FIG. 5 is another flowchart describing an embodiment of a method for carrying out the well-logging operation of FIG. 3, in accordance with an embodiment.

Additionally, the corrections may be performed for the formations 242 that lack high concentrations of heavy elements (e.g., clean sandstone, limestone, dolomite, etc.), but the count rate corrections may be minor. Accordingly, FIG. 5 is a flowchart 273 of an embodiment of a method for carrying out the well-logging operation 240 of FIG. 3 without a determination as to whether formation characteristics imply a need for correction. While the LWD module 120 is in the borehole 244, the neutron generator 206 may emit a burst of neutrons 246 into the formation 242 (block 274). The neutrons 246 may inelastically scatter 248 off certain elements of the formation 242, generating inelastic gamma rays 250. Count rate(s) of neutrons 246 as well as count rate(s) of inelastic gamma rays 250 may be obtained (block 275). As discussed above with reference to Equation (1), such count rate(s) of neutrons 246 generally may relate well to the fast neutron transport of the formation 242 for some formations 242 encountered in an oil and/or gas well.

In other formations 242, however, it is believed that the count rate(s) of neutrons 246 and/or the count rate(s) of gamma rays 250 may not adequately account for the neutron transport of such formations 242. Thus, at block 276, an elemental spectroscopy analysis is performed (e.g., a gamma-ray spectroscopy analysis) on the formation 242. In particular, using information obtained from the elemental spectroscopy operation by the gamma-ray detector 218 (i.e., inelastic or capture gamma-ray spectra detected by the gamma-ray detector 218), an estimate of a concentration of iron, aluminum, potassium, chlorine, titanium, or other heavy and non-heavy elements within the formation 242 may be determined.

To assist in accounting for the effects of heavy elements in the formation 242, or other elements in the formation 242 that may have a smaller effect on a formation density determination, on the measured count rates, in block 277, the data processing circuitry 200 may undertake any suitable correction of any of the terms of Equation (1), based on results of the elemental spectroscopy analysis, that may cause the NGD measurement to be generally accurate for the formation 242. Using the spectroscopy element concentration estimates, the count rate correction, in block 268, may take the form of Equation (2), above, where Z represents the remaining heavy elements that may have an effect on the NGD measurement, $CR_{net-inelastic}^{LSn,Corrected}$ is a corrected net inelastic count rate from the gamma-ray detector 220, $CR_{net-inelastic}^{LSn,UnCorrected}$ is an uncorrected net inelastic count rate from the gamma-ray detector 220, Y is the elemental concentration of the indicated heavy element within the formation 242 or any other elemental concentration within the formation 242 determined by the elemental spectroscopy process, and $\alpha$, $\beta$, $\gamma$, and $\zeta$ are sensitivity parameters that are constants relating to a number of detected gamma-rays per unit of elemental concentration. The constants $\alpha$, $\beta$, $\gamma$, and $\zeta$ may be determined in a laboratory or using a simulation by measuring a number of gamma-rays detected by the gamma-ray detector 220 from a given element versus a known concentration of that element in the formation 242. Applying the corrections for the elemental concentration makeup of the formation 242 may result in an NGD response that is corrected for the fast-neutron effects seen in the formations 242 containing various elemental concentrations.

Moreover, at block 268, the spectroscopy elemental concentrations Y of Equation (2) may be used to correct count rates of the neutron detectors 212, 214, 216A, and/or 216B in computing NGD spines (i.e., a neutron transport correction). Using the spectroscopy elemental concentration estimates Y, the neutron transport correction, in block 268, may take the form of Equation (3), above, where $CR_{Corrected}^{NearNeutron,FarNeutron}$ represents the corrected neutron count rates from the near neutron detectors 212 and/or 214 or the far neutron detectors 216A and/or 216B, $CR_{Uncorrected}^{NearNeutron,FarNeutron}$ represents the uncorrected neutron count rates from the near neutron detectors 212 and/or 214 or the far neutron detectors 216A and/or 216B, and $\alpha$, $\beta$, $\gamma$, and $\zeta$ are sensitivity parameters that are constants relating the number of detected neutrons per unit of elemental concentration. Similar to Equation (2), the constants $\alpha$, $\beta$, $\gamma$, and $\zeta$ may be determined in a laboratory or using a simulation by measuring a number of neutrons detected by the near neutron detectors 212 and/or 214 or the far neutron detectors 216A and/or 216B from a given element versus a known concentration of that element in the formation 242. Applying the corrections for the heavy elements and non-heavy elements in the formation 242 may result in an NGD response that is corrected for the fast-neutron effects seen in the formations 242 containing various elemental concentrations.

Further, in some embodiments, a weighting factor may be applied to the corrections when a concentration of an element is very low to minimize the effect of the correction on the count rate, and the full correction may be applied when the concentration is sufficiently high to enable the full effect of the correction on the count rate. It may also be appreciated that the fast neutron correction may be used as a shale indicator (i.e., to indicate the presence of aluminum or iron in the formation 242). Accordingly, the fast neutron correction may be used along with other shale indicators (e.g., natural gamma-ray, natural gamma-ray spectroscopy, capture and inelastic spectroscopy, neutron activation, etc.) to refine analysis of the lithology of the formation 242.

The data processing circuitry 200 may subsequently determine an NGD measurement of the formation 242 using the determined count rate(s) of neutrons 246, as well as the (corrected or uncorrected) count rate(s) of inelastic gamma rays 250 (block 278), and/or the (corrected or uncorrected) neutron transport correction function $f(CR_{neutron})$, and output the corrected density (block 279). By way of example, the data processing circuitry 200 may determine the NGD measurement based on the relationship represented by Equation (1).

It may be appreciated that while the NGD measurement in FIG. 4 is determined at block 278 after the correction is applied to the count rate(s), an uncorrected NGD measurement may be calculated prior to application of the correction. When the uncorrected NGD measurement is calculated prior to application of the correction, the effect of the correction on the NGD measurement may be subtracted from the uncorrected NGD measurement to determine the corrected NGD measurement. That is, instead of applying corrections on a front-end of the NGD calculation process, the correction effects on the NGD measurement may be applied on the back-end, after the uncorrected NGD measurement is calculated.

As mentioned above, although an NGD measurement such as determined using Equation (1) may accurately represent a density measurement for some formations 242, such an NGD measurement may not be accurate for other formations 242 such as formations having a relatively high concentration of heavy elements. This effect is apparent in a crossplot 280 of FIG. 6, which represents a crossplot modeling the known density of a variety of types of formations 242 against an NGD measurement for the formations 242 obtained using Equation (1) for which, for example, the neutron transport correction function $f(CR_{neutron})$ has not been corrected in the presence of, for example, a high concentration of heavy elements. In the crossplot 280, an ordinate 282 represents the logarithm of a neutron-transport-corrected gamma-ray count rate as detected by the LS gamma-ray detector 218, and an abscissa 284 represents electron density of the formation 242 in units of g/cc. A legend indicates various types of formations 242 that have been modeled in the crossplot 280, including limestone, sandstone, dolomite, alumina, and sandstone with hematite. A line 286 represents an accurate correlation between the neutron-transport-corrected gamma-ray count rate and the known formation density.

Figure 6:
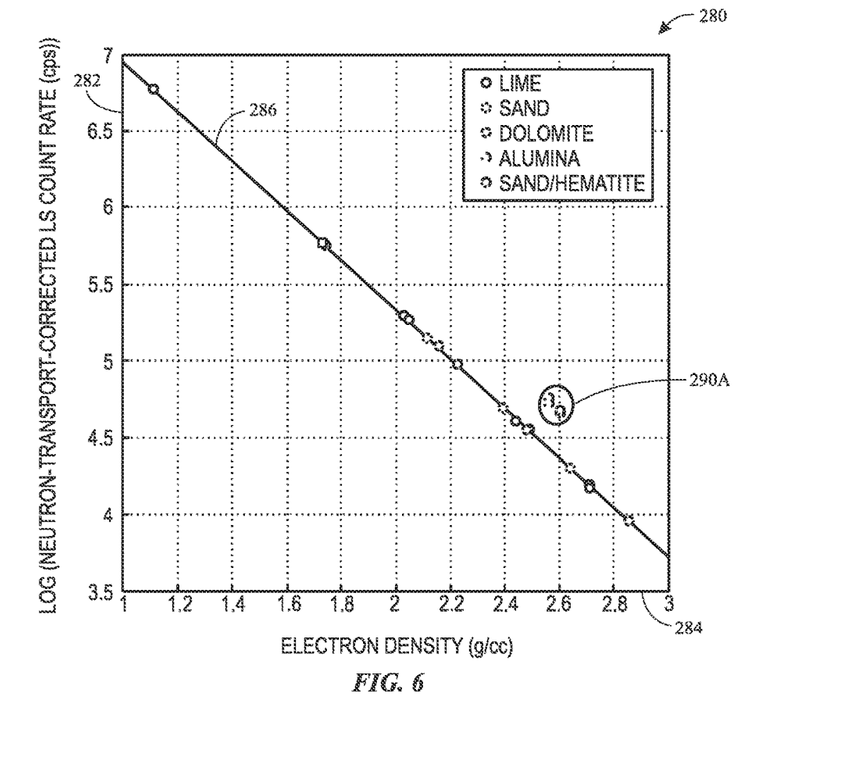
FIG. 6 is a crossplot comparing known formation density against formation density obtained without correcting neutron or gamma-ray count rates, in accordance with an embodiment.

As seen in the crossplot 280, for certain formations 242, despite variations in the densities of the formations 242, the calculated logarithm of neutron-transport-corrected gamma-ray count rates lies along the line 286 and accurately corresponds to the known density. These points represent the general accuracy of the NGD determination for these formations 242. However, for formations 242 that have heavy elements 290A, the calculated logarithm of neutron-transport-corrected gamma-ray count rates lies above the line 286. Since the calculated logarithm of neutron-transport-corrected gamma-ray count rates of these formations 242 with heavy elements 290A does not follow the same function of change with density as the other formations 242 (i.e., not falling along the line 286), NGD measurements for the heavy element formations 290A obtained using the same (uncorrected) calculations as the other formations 242 may be inaccurate.

It is believed that insufficient fast neutron transport correction may be responsible for the inaccurate calculations for these formations with the heavy elements 290A. Neutron transport corrections may be obtained by modifying, for example, the count rate(s) of inelastic gamma rays 250 and/or the neutron transport correction function $f(CR_{neutron})$ in a suitable manner, such that the calculated logarithm of neutron-transport-corrected gamma-ray count rates of the formations 242 that have heavy elements 290A are shifted to their proper placement along the line 286. Equations (2) and (3), discussed above in the discussion of FIG. 4, provide the shifting mechanism for the count rates of the inelastic gamma rays 250 and the transport correction function $f(CR_{neutron})$, respectively.

The correction to the count rate(s) of inelastic gamma rays 250, and/or the neutron transport correction function $f(CR_{neutron})$ that is applied in block 268 of FIG. 4 may depend on the indirect measurement of the fast neutron signal. In the crossplot 300 of FIG. 7, which represents a crossplot modeling the known density of a variety of types of formations 242 against an NGD measurement for the formations 242 obtained using Equation (1) for which, for example, the count rate(s) of inelastic gamma rays 250, and/or the neutron transport correction function $f(CR_{neutron})$ have been corrected in the presence of, for example, a high concentration of heavy elements. In the crossplot 300, the ordinate 282 represents the logarithm of a neutron-transport-corrected gamma-ray count rate as detected by the LS gamma-ray detector 218, and the abscissa 284 represents electron density of the formation 242 in units of g/cc. The legend indicates various types of formations 242 that have been modeled in the crossplot 300, including limestone, sandstone, dolomite, alumina, and sandstone with hematite. The line 286 represents an accurate correlation between the neutron-transport-corrected gamma-ray count rate and the known formation density.

Figure 7:
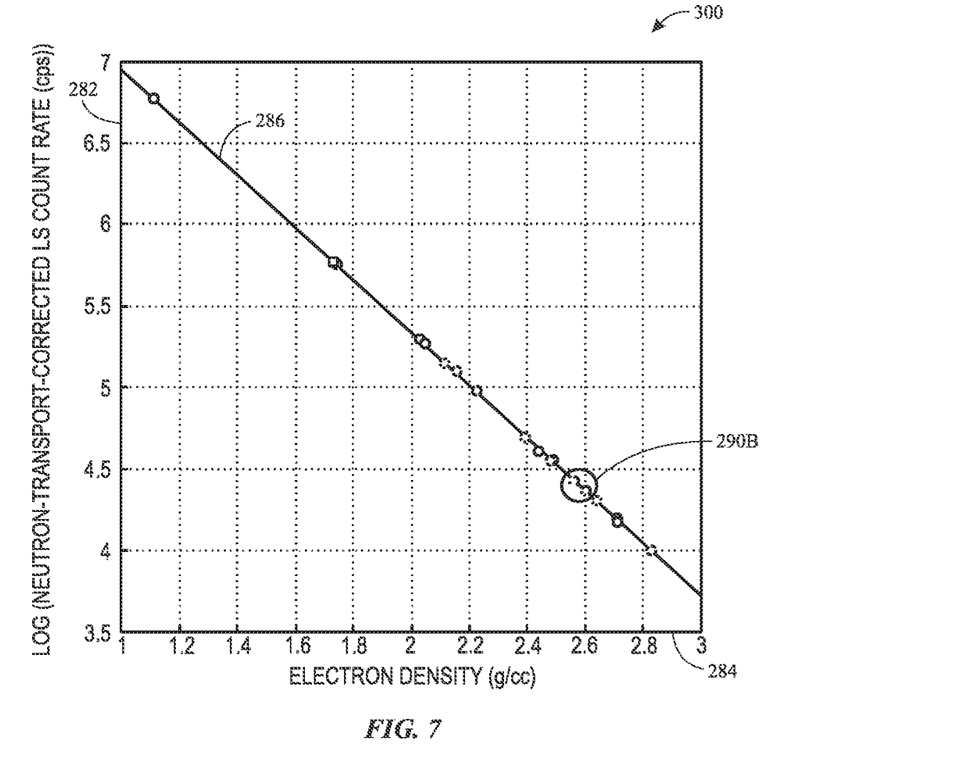
FIG. 7 is a crossplot comparing known formation density against formation density obtained with correcting neutron or gamma-ray count rates, in accordance with an embodiment.

As seen in the crossplot 300, despite variations in the densities of the formations 242, the calculated logarithm of neutron-transport-corrected gamma-ray count rates lies along the line 286 and accurately corresponds to the known density. These points represent the general accuracy of the NGD determination for these formations 242. Additionally, for formations 242 that have heavy elements 290B, the calculated logarithm of neutron-transport-corrected gamma-ray count rates lies along the line 286 after applying the correction at blocks 268 and/or 277. Neutron transport corrections may be obtained by modifying, for example, the count rate(s) of inelastic gamma rays 250 and/or the neutron transport correction function $f(CR_{neutron})$, for example using Equations (2) and (3), such that the calculated logarithm of neutron-transport-corrected gamma-ray count rates of the formations 242 that have heavy elements 290B are shifted to their proper placement along the line 286.

It may be appreciated that the techniques described above may be used in combination with other techniques for determinations of NGD measurements. For example, elemental spectroscopy corrections described above may be used in conjunction with a weighted least squares technique, a windowing technique, or various techniques for correcting for high concentrations of individual elements. In combining various techniques, the element spectroscopy corrections may provide an additional level of accuracy to the other techniques for determinations of NGD measurements.

Technical effects of the present disclosure include the accurate determination of a neutron-gamma density (NGD) measurement for a broad range of formations, including formations with heavy elements. These NGD measurements may remain accurate even when the configurations of a downhole tool used to obtain the neutron count rates and gamma-ray count rates used in the NGD measurement do not have optimal configurations. Thus, an accurate NGD measurement may be obtained using the systems and techniques disclosed above.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
    emitting neutrons into a formation using a neutron source of a downhole tool, such that at least a portion of the neutrons scatter off the formation to generate gamma-rays;
    detecting a first count rate of gamma-rays using at least one gamma-ray detector of the downhole tool;
    detecting a gamma-ray spectrum using the at least one gamma-ray detector of the downhole tool;
    detecting a second count rate of neutrons that return to the downhole tool using a neutron detector of the downhole tool;
    using a processor to perform a gamma-ray spectroscopy analysis on the formation based on the detected gamma-ray spectrum, wherein the gamma-ray spectroscopy analysis comprises determining a concentration of one or more elements that are present in the formation;
    determining a correction based at least in part on results of the gamma-ray spectroscopy analysis, wherein the correction comprises the concentration each of the one or more elements multiplied by a sensitivity parameter of each of the one or more elements, and wherein the sensitivity parameter relates to a number of detected gamma-rays or neutrons per unit of the elemental concentration of the least one of the one or more elements;
    subtracting the correction from the first count rate, the second count rate, or both;
    determining a neutron gamma density of the formation based at least in part on a first corrected count rate of gamma-rays, a second corrected count rate of neutrons, or both; and
    outputting the determined density of the formation.

2. The method of claim 1, comprising:
    determining whether the formation has a characteristic that is expected to cause the first count rate or the second count rate to result in the neutron gamma density determination that is not accurate without the correction based on the results of the gamma-ray spectroscopy analysis; and
    applying the correction to the first count rate, the second count rate, or both only when the formation has the characteristic that is expected to cause the first count rate or the second count rate to result in the neutron gamma density determination that is not accurate without the correction.

3. The method of claim 2, wherein determining whether the formation has the characteristic that is expected to cause the first count rate or the second count rate to result in the neutron gamma density determination that is not accurate without the correction comprises determining whether the formation comprises a concentration of heavy elements beyond a predetermined threshold.

4. The method of claim 1, wherein the gamma-rays comprise inelastic gamma-rays.

5. The method of claim 1, wherein the neutrons comprise thermal and/or epithermal neutrons.

6. The method of claim 1, wherein the gamma-ray spectroscopy analysis comprises determining an elemental concentration of at least one element of the formation based on the detected gamma-ray spectrum.

7. The method of claim 1, wherein the results of the gamma-ray spectroscopy analysis comprise elemental concentrations of heavy elements in the formation.

8. The method of claim 1, wherein the correction corresponds to:

$$\sum_i \alpha_i Y_i$$

wherein $Y_i$ is the concentration of each of the one or more elements within the formation, and $\alpha_i$ is the sensitivity parameters relating to a number of detected gamma-rays per unit of elemental concentration for each of the one or more elements.

9. The method of claim 1, wherein when a neutron transport characteristic is not expected to cause the first count rate, the second count rate, or both to result in the neutron gamma density determination that is not accurate without the correction, determining the neutron gamma density of the formation is based at least in part on the first count rate, the second count rate, or both without the correction.

10. The method of claim 1, wherein the neutron gamma density of the formation is determined at least based on the first count rate, the second count rate, and a neutron transport correction function, and at least one of the first count rate and the neutron transport correction function is corrected.

11. The method of claim 1, wherein the neutron gamma density of the formation is determined based at least in part on the following relationship:

$$\frac{\log(CR_\gamma^{inel}) - f(CR_{neutron}) - \log(C_{cal} \cdot N_S)}{c_1} = \rho_{electron},$$

where $\rho_{electron}$ represents the neutron gamma density of the formation, $CR_\gamma^{inel}$ represents the first count rate or the corrected first count rate, $CR_{neutron}$ represents the second count rate or the second corrected count rate, $f(CR_{neutron})$ represents the neutron transport correction function, $C_{cal}$ represents a calibration constant, $N_s$ represents an output of the neutron source, and $C_1$ represents a coefficient obtained experimentally or through nuclear modeling, or by a combination thereof.

12. A system, comprising:
a downhole tool comprising:
a neutron source configured to emit neutrons into a formation at an energy sufficient to cause at least a portion of the neutrons to inelastically scatter off elements of the formation, generating inelastic gamma-rays;
a gamma-ray detection assembly comprising at least a gamma-ray detector configured to detect a first count rate of inelastic gamma-rays that scatter through the formation to reach the downhole tool and a gamma-ray spectrum of the formation; and
a neutron detection assembly comprising at least a neutron detector configured to detect a second count rate of neutrons that return to the downhole tool; and data processing circuitry configured to:
perform a gamma-ray spectroscopy analysis on the gamma-ray spectrum of the formation, wherein the gamma-ray spectroscopy analysis comprises determining a concentration of one or more elements that are present in the formation;
correct the first count rate, the second count rate, or both based on results of the gamma-ray spectroscopy analysis by subtracting a correction, wherein the correction comprises the concentration each of the one or more elements multiplied by a sensitivity parameter of each of the one or more elements, and wherein the sensitivity parameter relates to a number of detected gamma-rays or neutrons per unit of the elemental concentration of the least one of the one or more elements; and
determine a density of the formation based at least in part on a first corrected count rate of inelastic gamma-rays, a second corrected count rate of neutrons, or both.

13. The system of claim 12, wherein the data processing circuitry is configured to determine whether the formation has a characteristic that is expected to cause the first count rate or the second count rate to result in a neutron gamma density determination that is not accurate without an additional correction.

14. The system of claim 12, wherein the neutron source is a pulsed neutron generator.

15. The system of claim 12, wherein the downhole tool comprises a logging while drilling configuration.

16. A non-transitory computer readable medium comprising executable instructions which, when executed by a processor, cause the processor to:
instruct a neutron source of a downhole tool to emit neutrons into a formation at an energy sufficient to cause at least a portion of the neutrons to inelastically scatter off elements of the formation, generating inelastic gamma-rays;
instruct at least a gamma-ray detector to detect a first count rate of inelastic gamma-rays that scatter through the formation to reach the downhole tool and a gamma-ray spectrum of the formation;
instruct at least a neutron detector to detect a second count rate of neutrons that return to the downhole tool;
perform a gamma-ray spectroscopy analysis on the formation based on the gamma-ray spectrum, wherein the gamma-ray spectroscopy analysis comprises determining a concentration of one or more elements that are present in the formation;
determine a neutron gamma density of the formation based at least in part of the first count rate of inelastic gamma rays and the second count rate of neutrons;
determine a correction of the neutron gamma density based at least in part on results of the gamma-ray spectroscopy analysis, wherein the correction comprises the concentration each of the one or more elements multiplied by a sensitivity parameter of each of the one or more elements, and wherein the sensitivity parameter relates to a number of detected gamma-rays or neutrons per unit of the elemental concentration of the least one of the one or more elements;
subtract the correction from the first count rate of inelastic gamma rays and the second count rate of neutrons of the neutron gamma density of the formation to determine a corrected neutron gamma density; and
output the determined density of the formation.

17. The non-transitory computer readable medium of claim 16, wherein the instructions, when executed by a processor, cause the processor to:

determine whether the formation has a characteristic that is expected to cause the first count rate or the second count rate to result in the neutron gamma density determination that is not accurate without the correction based on the results of the gamma-ray spectroscopy analysis; and apply the correction to the first count rate, the second count rate, or both only when the formation has the characteristic that is expected to cause the first count rate or the second count rate to result in the neutron gamma density determination that is not accurate without the correction.

18. The non-transitory computer readable medium of claim 16, wherein the instructions to perform the gamma-ray spectroscopy analysis comprise instructions that, when executed by the processor, cause the processor to determine an elemental concentration of at least one element of the formation based on the detected gamma-ray spectrum.

* * * * *